United States Patent
Sjostrom et al.

(10) Patent No.: US 6,971,107 B2
(45) Date of Patent: Nov. 29, 2005

(54) SYSTEM AND METHOD FOR FRAME STORAGE OF EXECUTABLE CODE

(75) Inventors: William Montgomery Sjostrom, Rome, PA (US); Russell Thomas White, Jr., Conklin, NY (US)

(73) Assignee: International Business Machines Corporation, Armonk, NY (US)

( * ) Notice: Subject to any disclaimer, the term of this patent is extended or adjusted under 35 U.S.C. 154(b) by 747 days.

(21) Appl. No.: 09/815,316

(22) Filed: Mar. 22, 2001

(65) Prior Publication Data

US 2002/0138658 A1   Sep. 26, 2002

(51) Int. Cl.[7] ............................................. G06F 15/163
(52) U.S. Cl. ...................................... 719/310; 715/700
(58) Field of Search ........................ 705/205; 719/310; 715/700

(56) References Cited

U.S. PATENT DOCUMENTS 6,144,991 A  * 11/2000 England ..................... 709/205
6,430,538 B1 *  8/2002 Bacon et al. ................... 705/9
6,643,690 B2 * 11/2003 Duursma et al. ........... 709/217

OTHER PUBLICATIONS

Yehuda Shiran, Sharing functions between frames, Jul. 29, 2000.*
JavaScrip and Frames, Part II- The Famous Memory Game, Apirl 5, 1999.*
Tomy Negrino, JavaScript for the World Wide Web: Visual QuickStar Guide ( 3 rd Edition), 2000.*

* cited by examiner

*Primary Examiner*—Meng-Al T. An
*Assistant Examiner*—LeChi Truong
(74) *Attorney, Agent, or Firm*—Shelley M Beckstrand; William E. Schiesser (57) ABSTRACT

A system and method for client/server communications, the method including the steps of loading to a client browser a frame set including a function frame and a content frame; loading application code to the function frame; and responsive to user interaction with the content frame, executing the application code. The frame set may also include navigation frame and a data accumulation frame. By using the frame set to store executable application code, collect and store data, and interact with a user, an application may be executed at a client browser substantially without client/server interaction beyond initializing the frames and communicating the end results.

2 Claims, 7 Drawing Sheets

```
                    ┌──442                    ┌─441   ┌─443
                    │                         │       │
                    │         REQ/CAT WEB
                    ├─────────────────────────────────────────┐
   NEW REQ          │  PURCHASE REQUEST
   NEW RFC          │     REQUISITION SUMMARY
   VIEW REQ         │        REQUESITION STATUS:    NEW
   GO TO CONF       │        REQUEST ID             U94HRB
                    │        REQUEST DATE           03/30/01
                    │        INTERNAL/RESALE        INTERNAL
                    │        TOTAL PRICE            0
                    │
                    │     REQUESTER SUMMARY
                    │        REQUESTER              RUSSELL WHITE/IBM-E
                    │        INITIATOR              RUSSELL WHITE/IBM-E
                    │        COUNTRY                US
                    │        COMPANY                0147
                    │        PLANT                  1501
                    │        DEPARTMENT             T390
                    │
                    │     REQUISITION ITEMS
                    │        NO ITEMS PRESENT
                    │
                    │     ┌──────────────┐   ┌───────┐
                    │     │SHOP FOR ITEMS│   │ CLOSE │
                    │     └──────────────┘   └───────┘
                    ├──────────┬────────┬────────┬─────────┬──────────┐
                    │W3.IBM.COM│SUPPORT │ SEARCH │FEEDBACK │WWW.IBM.COM│
                    └──────────┴────────┴────────┴─────────┴──────────┘
                     └─444                                  445─┘ └─446
```

SYSTEM AND METHOD FOR FRAME STORAGE OF EXECUTABLE CODE

CROSS REFERENCES TO RELATED APPLICATIONS

The following U.S. patent applications, filed concurrently or otherwise copending, are assigned to the assignee hereof and contain subject matter related, in certain respect, to the subject matter of the present application.

Ser. No. 09/657,215, filed 7 Sep. 2000, entitled "System and Method for Clustering Servers for Performance and Load Balancing";

Ser. No. 09/657,216, filed 7 Sep. 2000, entitled "System and Method for Front End Business Logic and Validation";

Ser. No. 09/657,217, filed 7 Sep. 2000, entitled "System and Method for Data Transfer With Respect to External Applications";

Ser. No. 09/656,037, filed 7 Sep. 2000, entitled "System and Method for Providing a Relational Database Backend";

Ser. No. 09/656,803, filed 7 Sep. 2000, entitled "System and Method for Providing a Role Table GUI via Company Group";

Ser. No. 09/656,967, filed 7 Sep. 2000, entitled "System and Method for Populating HTML Forms Using Relational Database Agents";

Ser. No. 09/657,196, filed 7 Sep. 2000, entitled "System and Method for Catalog Administration Using Supplier Provided Flat Files";

Ser. No. 09/657,195, filed 7 Sep. 2000, entitled "System and Method for Providing an Application Navigator Client Menu Side Bar";

Ser. No. 09/819,462, filed 28 Mar. 2001, entitled "SYSTEM AND METHOD FOR AUTOMATING INVOICE PROCESSING WITH POSITIVE CONFIRMATION";

Ser. No. 09/815,318, filed 22 Mar. 2001, entitled "SYSTEM AND METHOD FOR GENERATING A COMPANY GROUP USER PROFILE";

Ser. No. 09/819,437, filed 28 Mar. 2001, entitled "SYSTEM AND METHOD FOR SHARING DATA ACROSS FRAMES USING ENVIRONMENT VARIABLES";

Ser. No. 09/815,317, filed 22 Mar. 2001, entitled "SYSTEM AND METHOD FOR SYNCHRONIZING LEDGER ACCOUNTS BY COMPANY GROUP";

Ser. No. 09/815,320, filed 22 Mar. 2001; entitled "SYSTEM AND METHOD FOR GROUPING COMPANIES ACCORDING TO ACCOUNTING SYSTEM OR RULES";

Ser. No. 09/815,313, filed 22 Mar. 2001, entitled "SYSTEM AND METHOD FOR INVOICE IMAGING THROUGH NEGATIVE CONFIRMATION PROCESS";

Ser. No. 09/815,312, filed 22 Mar. 2001, entitled "SYSTEM AND METHOD FOR LEVERAGING PROCUREMENT ACROSS COMPANIES AND COMPANY GROUPS";

Ser. No. 09/816,264, filed 23 Mar. 2001, entitled "SYSTEM AND METHOD FOR PROCESSING TAX CODES BY COMPANY GROUP"; and Ser. No. 09/798,598, filed 2 Mar. 2001, entitled "SYSTEM AND METHOD FOR MANAGING INTERNET TRADING NETWORKS".

The above-identified patent applications are incorporated herein by reference.

BACKGROUND OF THE INVENTION

1. Technical Field of the Invention

This invention pertains to client/server communications in a web environment. More particularly, it relates to loading application code to browser frames for execution at the client and optimize client/server communications.

2. Background Art

A server/client requisition and catalog (ReqCat Web, or RCW) application has heretofore been server intensive. Even the simplest operation (e.g. calculation of the final price as quantity times unit price) has been done by Lotus Notes agents at the server. JavaScript code has been used in the browser to perform some of these simple calculation, for in-browser validation of data prior to going to the server, to minimize wasted server interaction when the data was not correct, and to perform more complicated calculations, validation, and complex business logic. Unfortunately, all this JavaScript code needed to be sent to the browser with each screen. Many of the screens contained hundreds of kilobytes of information for most common or screen specific JavaScript functions. In this arrangement, not only is it necessary to wait for the server to send the information, but also a very significant wait time is experienced while this information traverses the web. It has not been uncommon for the client user to wait many seconds between each click or field data change.

"Cookies" and other forms of downloaded software have previously been used, however these are loaded to the hard drive, consuming storage space at the client even when the application is not active, and are limited as to the amount of information that can be stored and how it can be used.

In such systems, very slow performance is observed when all primary user and data logic operations are performed on the server. Every time data is manipulated, such as by changing a quantity field and a need to recalculate a computed total price field, a trip to and from the server is required. There is a need, therefore, for a system and method for putting the application code in the browser on a web page where user and/or data logic can be executed while working on that page thus giving the user essentially instantaneous response.

When, as is often required, significant quantities of data, together with formatting code and business or validation logic code must be transferred to the browser each time a new page is loaded, performance degrades. Complicated pages required such significant quantities, often in excess of 200K bytes. There is a need to reduce the number of trips between server and browser when performing operations on a page or occasioned by loading new pages by storing reusable code in the browser where it can be called locally when needed by code in the browser.

Consequently, there is a need in the art for a system and method for improving server/database utilization and application performance (from a client browser, or users, perspective).

It is an object of the invention to provide a system and method for minimizing client browser interaction with the server.

It is a further object of the invention to provide a system and method for optimizing client browser interaction with a server by storing data and executable code in frames.

SUMMARY OF THE INVENTION

A system and method for client/server communications, the method including the steps of loading to a client browser a frame set including a function frame and a content frame; loading application code to the function frame; and responsive to user interaction with the content frame, executing the application code.

In accordance with an aspect of the invention, there is provided a computer program product configured to be operable for client/server communications according to method steps loading to a client browser a frame set including a function frame and a content frame; loading application code to the function frame; and responsive to user interaction with the content frame, executing the application code.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
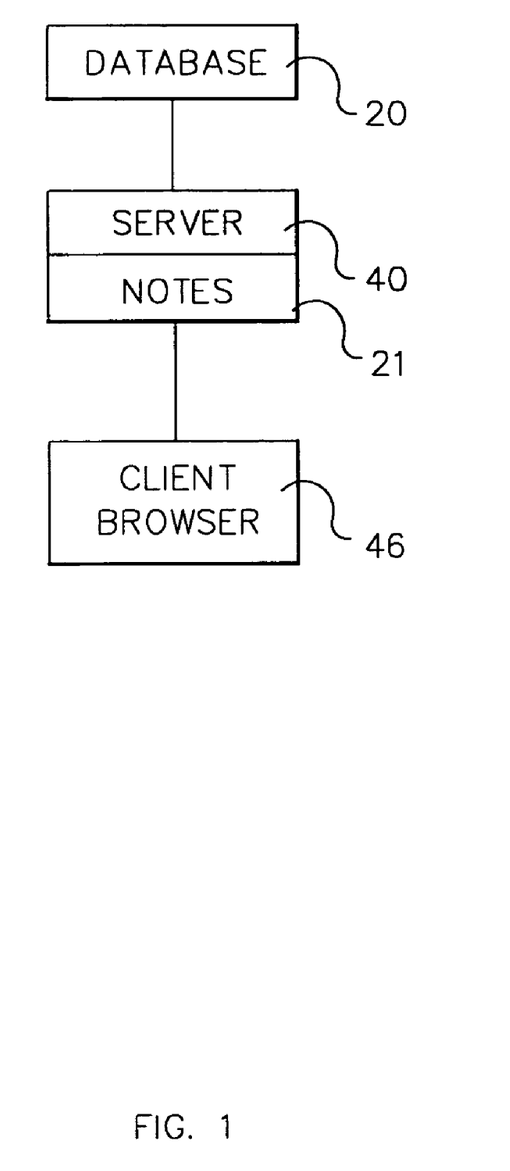
FIG. 1 is a diagram illustrating the system environment of the preferred embodiment of the invention.

Referring to FIG. 1, in accordance with the preferred embodiment of the invention, there is provided a system and method for minimizing client browser 46 interaction with the server 40. Other components of the system include database 20 and Notes 21. To optimize server/client communications, of executable application code from server 40 is stored and processed in client browser 46 frames. This use of frames allow executable code to be "shipped to" and "stored in" the browser during initial application load-up, and then does not have to be "shipped' again to be used by various parts of the application.

Figure 2:
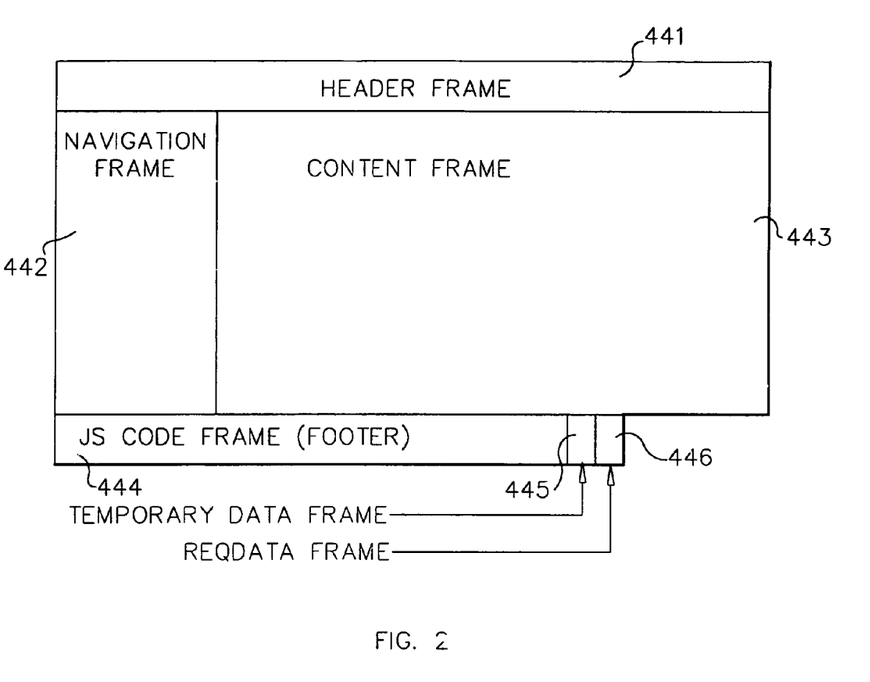
FIG. 2 is a representation of a browser window illustrating the frames of the preferred embodiment of the invention.
Figure 3:
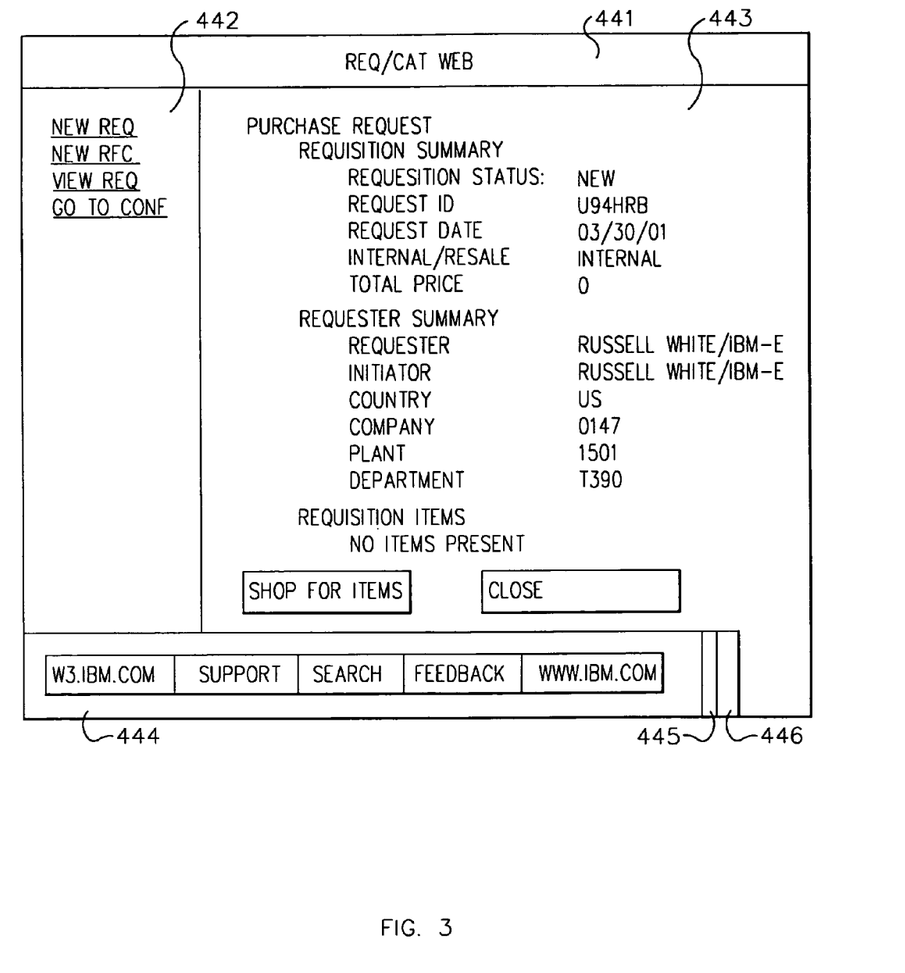
FIG. 3 is a representation of the browser window of FIG. 2 containing example data information for a requisition and catalog (Req/Cat Web) application purchase request frame set.

Referring to FIG. 2, a browser 46 window is provided with a frame set including header frame 441, navigation frame 442, content frame 443, footer frame 444, temporary data frame 445, and data accumulation (or, ReqData) frame 446.

Content frame 443 is the user frame, the frame used for display of, for example, requisition information and user data entry and other interaction.

Jscode frame 444, also referred to as the footer frame, is a function frame—a frame for holding javascript functions and variables that are called by code in all other frames.

Temporary data frame 445 is a staging frame used as a place to temporarily hold data, functions, and to load web pages for special processing. The content of this frame normally is not visible to the user.

ReqData frame 446 is a data accumulation frame, primarily used to hold and accumulate data entered by the user or generated by functions in the other frames. The content of this frame normally is not visible to the user.

Navigation frame 442 provides links or buttons for the user to choose application options and controls the information provided to content frame 443.

Header frame 441 has no functional uses, but rather is a place to hold stationary application graphics.

In accordance with the preferred embodiment of the invention, Javascript functions and other code elements are loaded into footer frame 444 when the application initially loads, where they are available for access and use by any of the other frames without requiring that such code be loaded again from server 40, or waiting for processing to be done at the server by Notes 21. From the user's perspective, many of the processes that would take many seconds when done on the server now appear to execute essentially instantaneously. By this process, 'system configuration" variables that can contain information needed by different parts of the application at different times (e.g. Notes-Version-Number being used and the users Company-Group-Code) are available for instantaneous use.

Further, in accordance with the invention, a data store frame 446, in which data accumulates during user interaction with, for example, content frame 443 without requiring client/server communication with each field entry. In a requisition and catalog application, for example, as the user adds items to the requisition, this information is accumulated in fields in data accumulation frame 446, which is a frame the user is unaware of. Only when the user wants to store a permanent copy of the requisition (as a draft or template for later processing, or as a final submitted requisition) does the information get sent to server 40 to be saved in database 20 (as a Notes document in this specific implementation, but could be any type of permanent database).

Having the requisition and item information stored in one of the frames in the browser allows for very fast interaction with business logic and validation code, stored in another frame in the browser. Very significant processing can be done totally in the browser, without any need for interaction with the servers, thus eliminating server wait time and web transmission time. Interaction with the server is done primarily when additional information is needed from some external source (database 20, such as a DB2 table or Notes database), or when information is to be permanently stored.

Temporary data frame 445 is an example of a storage or staging frame in which information that is obtained from server 40 (e.g. commodity specific general ledger account information that is needed at the time when the user selects "Proceed to Accounting') at one point in the application, is held available for subsequent use. Code is used to check to see if required information is already available in temporary data frame 445 for quick use, and only if not would it need to be obtained from server 40 or database 20.

Figure 4:
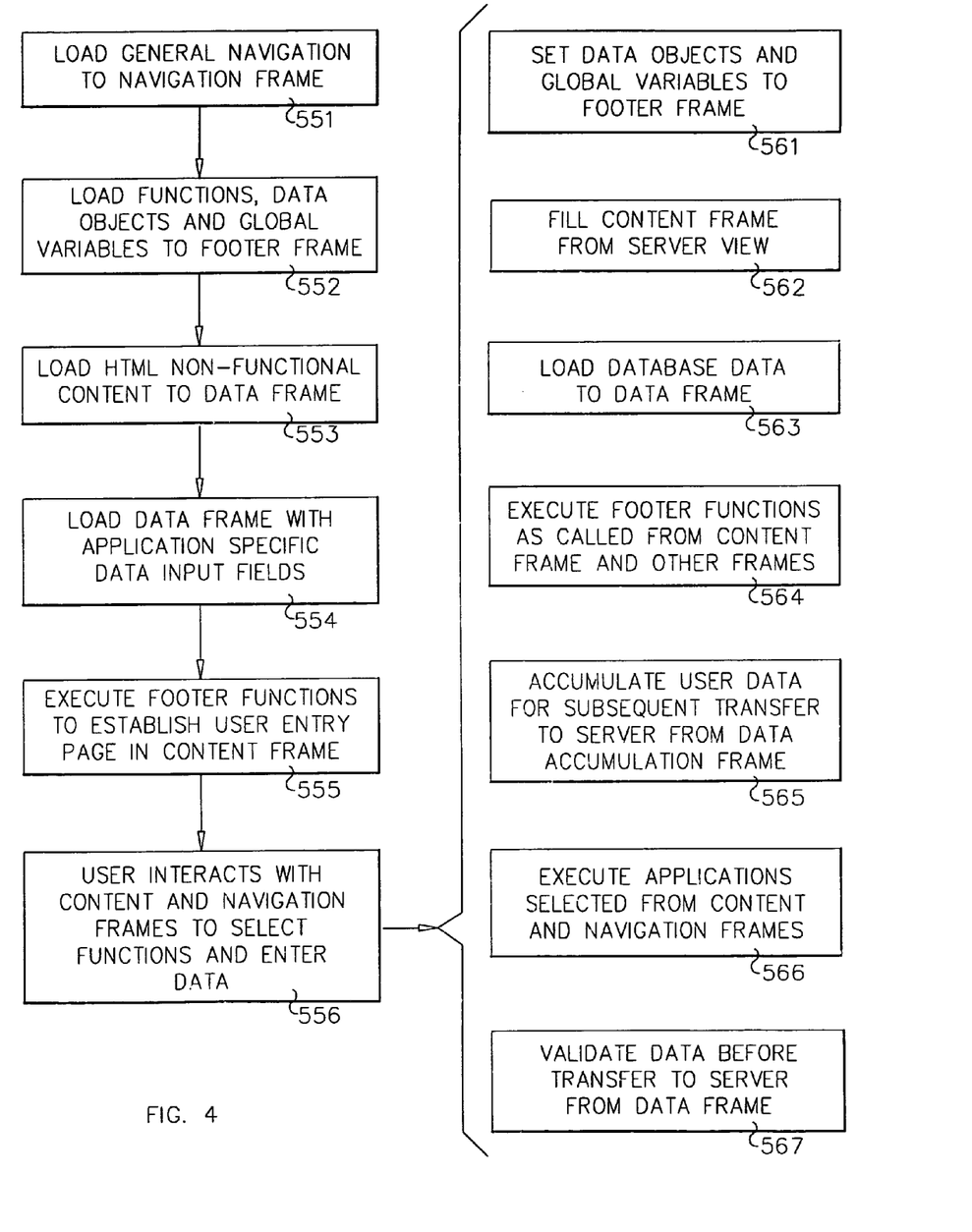
FIG. 4 is a flow chart representation of the method of the preferred embodiment of the invention executing a client/server application with respect to data and functional code loaded to client browser frames.

Referring to FIG. 4, in step 551 general navigation is loaded to navigation frame 442. In step 552 functions, data objects, and global variables are loaded to and/or set in the footer, or Jscode frame 444. In step 553, html non-functional content is loaded to data accumulation frame 446, and in step 554 application specific data input fields are loaded. In step 555, code from footer frame 444 is executed to establish an application specific user entry and interaction page in content frame 443. In step 556, the user interacts with the application specific content frame and navigation frame to select functions and enter data.

Steps 561-567 represent various functions executed in response to user interaction with content and navigation frames 443, 442 in step 556. In step 561, data objects and global variables are entered to footer frame 444. In step 562 content frame 443 is filled with a view from server application code 21. In step 563, data from database 20 is loaded to data frame 20. In step 564, footer 444 code is executed as called from other frames 442–446, including content frame 443. In step 565, user data and selections from content frame, for example, are accumulated in data frame 446 for subsequent communication to server 40 and database 20. In step 566, applications selected from content and navigation frames 443, 442 are executed with reference to code and data in frames 444–446. In step 567, data accumulated in the browser frame set is validated before transfer to server 40 and database 20.

Figure 5:
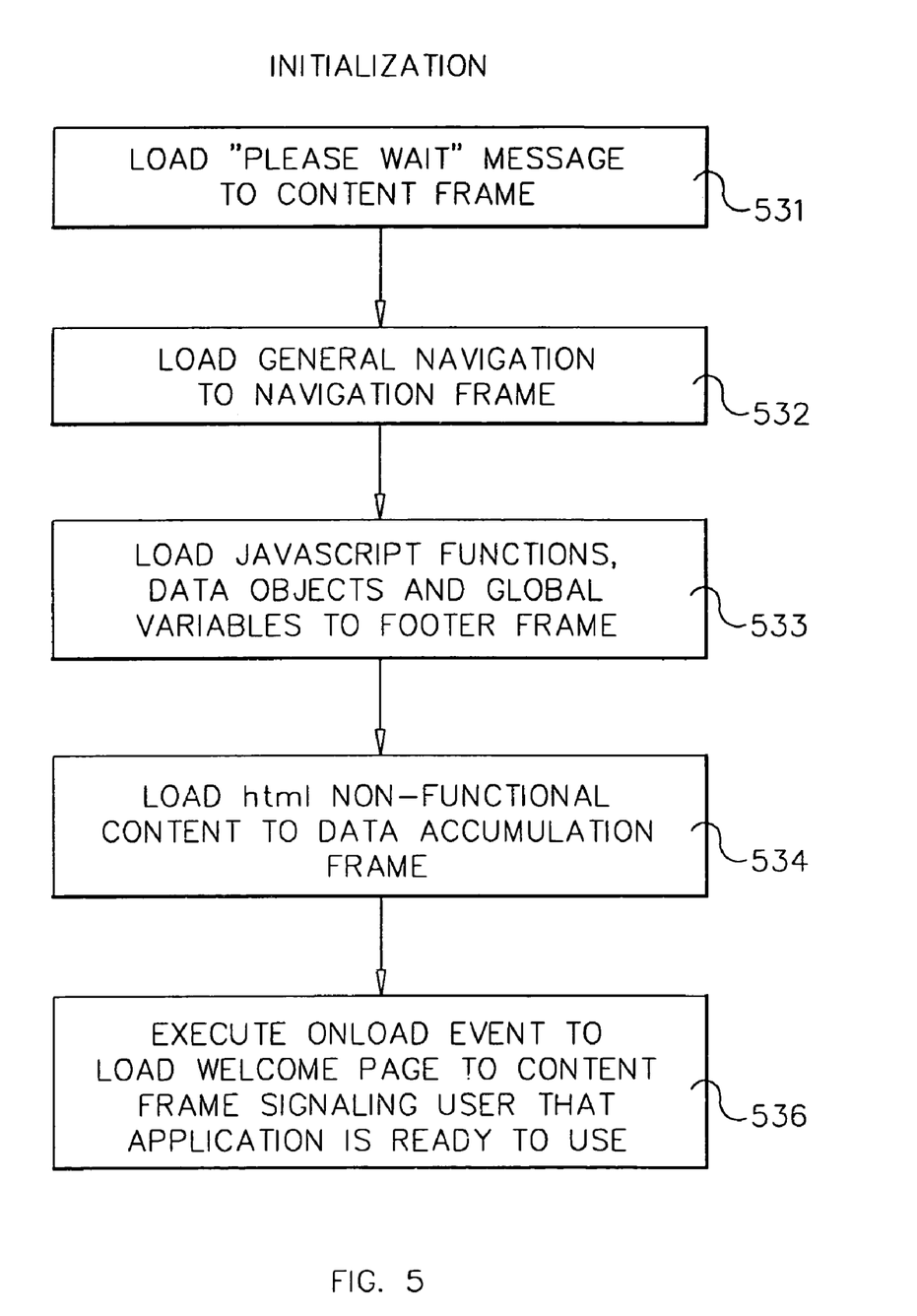
FIGS. 5–7 are flow charts representing a more specific, exemplary embodiment of the invention, in this case for implementing a requisition application.
Figure 6:
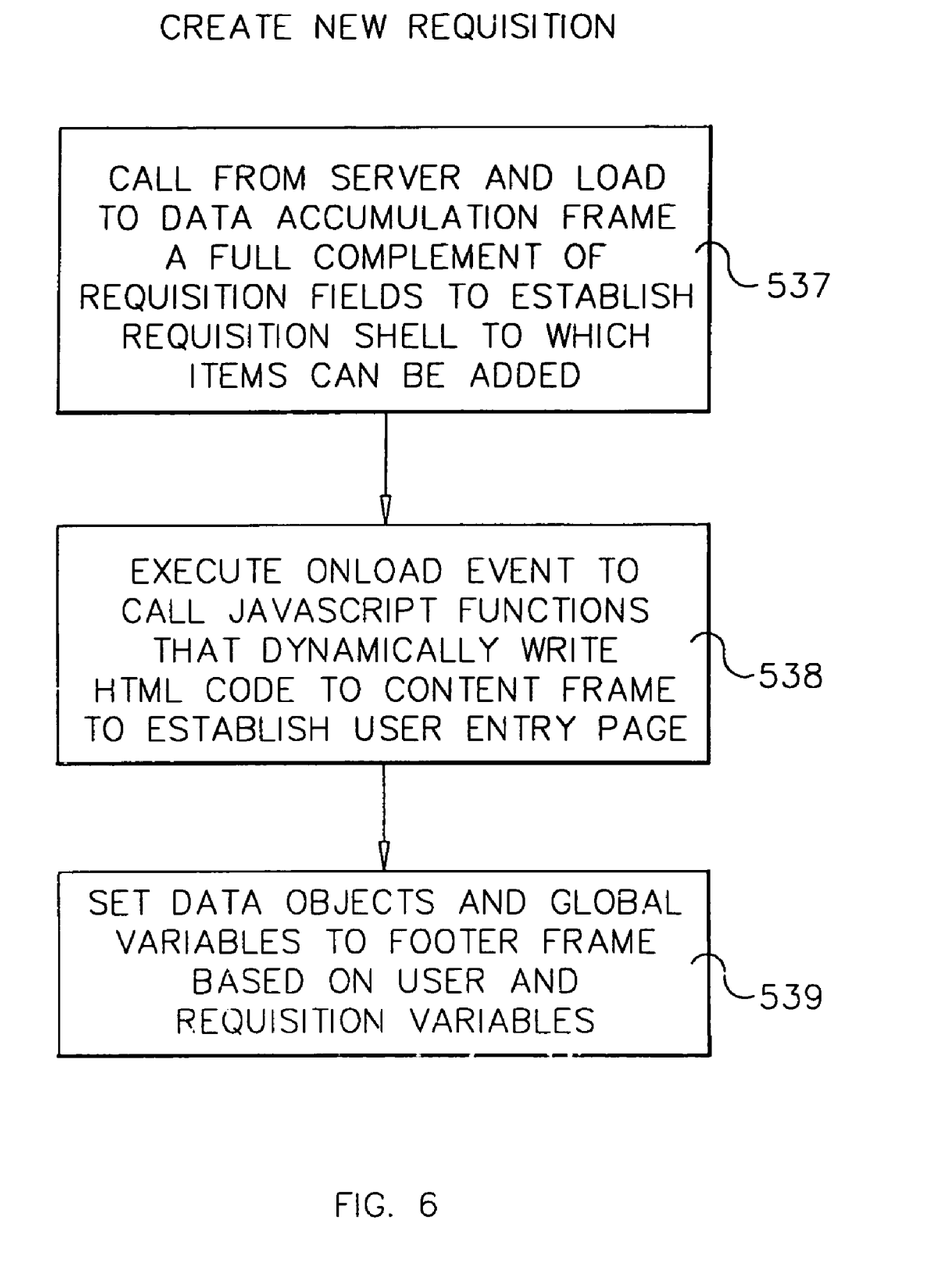
Figure 7:
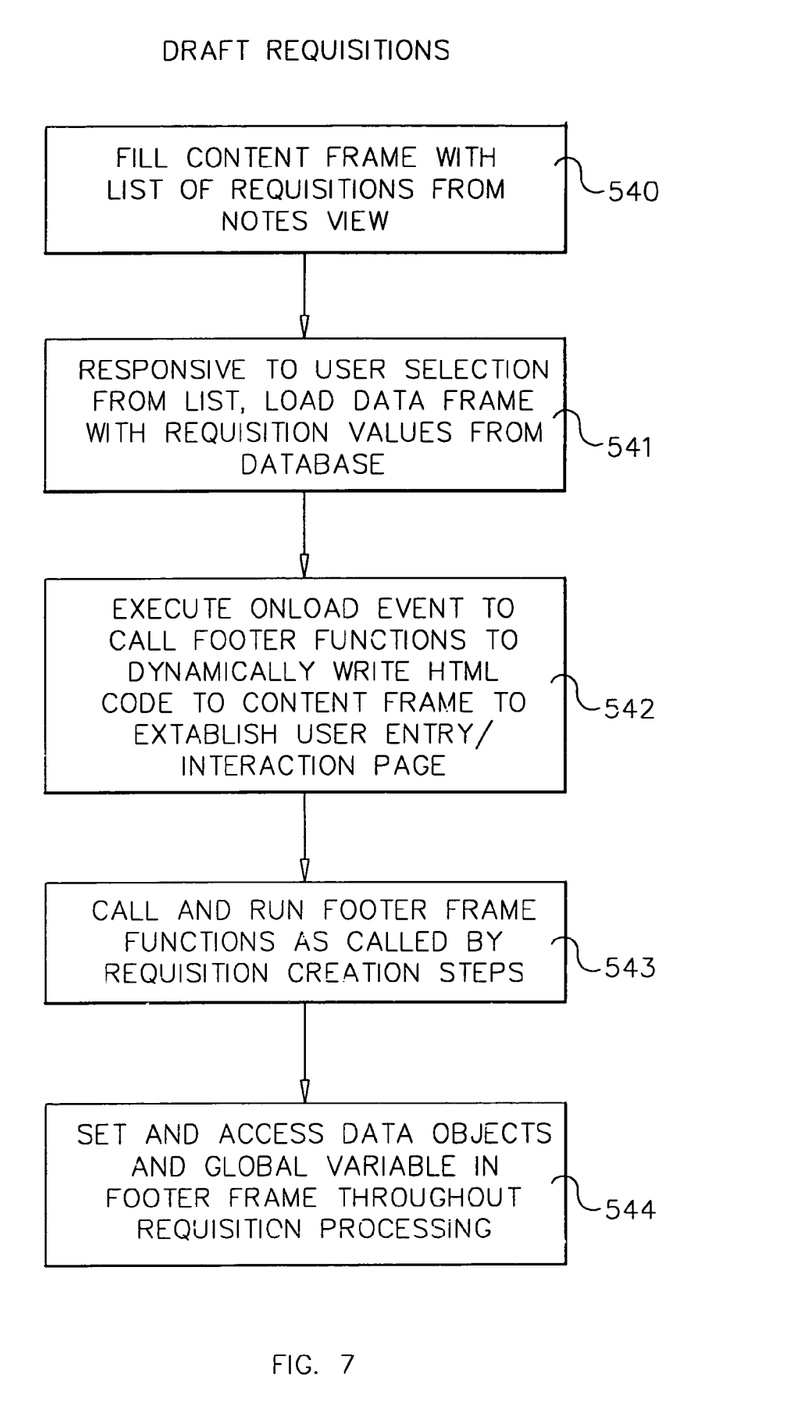

Referring to FIGS. 5–7, different steps in an application cause various frames to be loaded with individual html files.

Referring to FIG. 5, during initialization of a requisition application, in step 531, content frame 443 is loaded with a "Please Waite While Application Loads" message. In step 532, navigation frame 442 is loaded with general navigation. In step 533 JavaScript (Jscript) code is loaded with JavaScript functions, data objects, and global variables. In step 534, data frame 446 is loaded with very basic html, non-functional content. In step 536, when the overall frame set is initialized, an onload event executes which loads a general welcome page into content frame 443, signaling the user that the application is ready to use. The user responds by choosing, in this example, "Create New Requisition", a selection option presented to him in content frame 443.

Referring to FIG. 6, in this requisition example, in step 537 a Notes 21 form comprising a full complement of the requisition fields is called and output through Domino to the data frame 446, thereby establishing a basic requisition shell to which requisition items can be added. In step 538, when data frame 446 finishes loading, an onLoad event calls Javascript functions from footer frame 444 that dynamically write html code to content frame 443 to establish a user entry page. In step 539, data objects and global variables are set in the Jscode, or footer, frame 444 based on user and requisition variables.

Referring to FIG. 7, responsive to user selection of a draft requisitions application, in step 540 a notes 21 view is called that fills the content frame 443 with a list of requisitions the user may open. In step 541, responsive to user selection of a requisition from the list, a requisition information is retrieved from its storage location, such as a Notes 21 document or a DB2 database 20, and is loaded into data frame 446 with the values set as they were when the selected requisition was last saved. In step 542, when data frame 446 finishes loading, an onLoad event calls Javascript functions from footer frame 444 that, with reference to data frame 446, dynamically write html code to the content frame thereby establishing a user entry/interaction page. In step 543, various Javascript functions in the Jscode frame 444 are called and run during the various steps involved in creating a complete requisition. In step 544, Jscode data objects and global variables are set based on requisition and item information, and can be accessed throughout requisition processing.

In accordance with exemplary embodiments of the invention, the concept of a place in the browser to store local code is extended to hold local data as well. Again this eliminates the need to go to the servers 40 as data in entered by the user in content frame 443 at different stages as a requisition is created. Data is accumulated in data frame 446 and stored in the browser as the user adds information. This data is then sent as a whole to the server once, again minimizing time.

Since now there is the ability to hold data and logic in the browser 46, data validation can be performed there. Data can be checked before a trip to the server 40 is done. Reasonable amounts of user, option or validation data can be stored in the browser at start up, or obtained when convenient or time effective for use later.

Other frames may be used as a staging or special code operation area as needed. This allows for specialized code and/or data to be loaded as needed into the browser 46 for special operations.

In accordance with the various embodiments of the invention, frames within a browser frameset may be used to hold static, reusable code (e.g. javascript functions) that is loaded once, at start up; to hold accumulated data; to interact with the user; to provide a staging/working area for other interim processes; to maintain or alter variables that contain information that is used at different points throughout the application. Some frames can be dedicated to specific tasks, such as navigation; can be dynamically generated from code in one of the other frames, thereby producing custom pages without even needing to interact with the server for the entire page.

Through the use logic and code loaded to browser frames, significant data manipulation/verification, user interaction, and data storage can be done wholly within browser 46, minimizing time consuming, and server consuming, client-server interaction over the web.

By way of further exemplary embodiments, when a user adds or chooses additional input data, functions in the footer 444 are called to manipulate and/or validate user input data. As each new user entry is accepted, data is stored in ReqData frame 446, and additional user input is offered. The user concludes input of new items and proceeds. When the user is done entering data and wants to save the data to the server, the contents of the ReqData frame 446 are sent as a whole to the server one time for saving. If the user wants to proceed with additional processing of the data, a choice is made, from options on the main user frame 443, or from the navigation frame 442, to load a different page into the main user frame 443. The new page in the main user frame 443 then can call on the data already in the ReqData frame 446 to continue processing. Thereupon, the User can select other application choices, including getting a new list and loading a different document, other application operations or terminate the application

Advantages Over the Prior Art

It is an advantage of the invention that there is provided a system and method for minimizing client browser interaction with the server.

It is a further advantage the invention that there is provided a system and method for optimizing client browser interaction with a server by storing data and executable code in frames.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Java Script, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for client/server communications in a requisition and catalog system including a server and a client browser, comprising the steps of:
    loading to said browser at said client a frame set including a function frame, a data accumulation frame, a header frame, and a content frame;
    during an initialization phase,
        loading general navigation parameters for a requisition and catalog application to said navigation frame;
        loading application code including footer functions, data objects, and global variables for said application from said server to said function frame at said client, said function frame for storing functions and variables that are called by code in all other frames of said frame set;
        loading said data accumulation frame with non-functional content consisting of requisition and catalog system application specific data input fields;
        executing said footer functions to establish a user entry page in said content frame;
        executing an on load event to load a welcome page to said content frame signaling a user that said application is ready to use;
    responsive to user interaction with said content frame, executing said application code at said client without further communication to said server to enable said user to select functions and enter data, said functions including
        setting data objects and global variables to said function frame;
        filling said content frame from a server view;
        loading database data to said data accumulation frame;
        executing footer functions called from said content frame, said function frame, said data accumulation frame, and said function frame;
        accumulating user data for subsequent transfer to said server from said data accumulation frame;
        executing application selected by said user from said content frame and said navigation frame; and
        validating data before transfer to said server from said data accumulation frame;
    during a create new requisition phase,
        calling from said server and loading to said data accumulation frame a full complement of requisition fields for establishing a requisition shell to which requisition items can be added by said user;
        executing an on load event when said data accumulation frame finishes loading to call script functions from said footer frame for dynamically writing html code to said content frame to establish a user entry page; and
        setting data objects and global variables in said function frame based on user and requisition variables;
    responsive to user selection of a draft requisitions application,
        filling said content frame with a list of requisitions said user may open;
        responsive to user selection of a selected requisition from said list of requisitions, retrieving requisition information from storage location and loading said data accumulation frame with values set as they were when said selected requisition was last saved;
        upon said data accumulation frame being loaded with said values, executing an on load event to call script functions from said function frame that, with reference to said data accumulation frame dynamically writes html code to said content frame to establish a user entry/interaction page; and
        executing script functions from said function frame responsive to user interaction with said user entry/interaction page to create a complete requisition.

2. A computer program product for client/server communications in a requisition and catalog system including a server and a client browser, said computer program product comprising:
    a computer readable medium;
    first program instructions to load to said browser at said client a frame set including a function frame, a data accumulation frame, a header frame, and a content frame;
    second program instructions, during an initialization phase,
        to load general navigation parameters for a requisition and catalog application to said navigation frame;
        to load application code including footer functions, data objects, and global variables for said application from said server to said function frame at said client, said function frame for storing functions and variables that are called by code in all other frames of said frame set;
        to load said data accumulation frame with non-functional content consisting of requisition and catalog system application specific data input fields;
        to execute said footer functions to establish a user entry page in said content frame; and
        to execute an on load event to load a welcome page to said content frame signaling a user that said application is ready to use;
    third program instructions, responsive to user interaction with said content frame, to execute said application code at said client without further communication to said server to enable said user to select functions and enter data, said functions including
        setting data objects and global variables to said function frame;
        filling said content frame from a server view;
        loading database data to said data accumulation frame;
        executing footer functions called from said content frame, said function frame, said data accumulation frame, and said function frame;
        accumulating user data for subsequent transfer to said server from said data accumulation frame;
        executing an application selected by said user from said content frame and said navigation frame; and
        validating data before transfer to said server from said data accumulation frame;
    fourth program instructions, during a create new requisition phase, to call from said server and load to said data accumulation frame a full complement of requisition fields for establishing a requisition shell to which requisition items can be added by said user;

to execute an on load event when said data accumulation frame finishes loading to call script functions from said footer frame for dynamically writing html code to said content frame to establish a user entry page; and to set data objects and global variables in said function frame based on user and requisition variables;

fifth program instructions, responsive to user selection of a draft requisitions application, to fill said content frame with a list of requisitions said user may open;

responsive to user selection of a selected requisition from said list of requisitions, to retrieve requisition information from storage location and load said data accumulation frame with values set as they were when said selected requisition was last saved;

upon said data accumulation frame being loaded with said values, to execute an on load event to call script functions from said function frame that, with reference to said data accumulation frame, dynamically writes html code to said content frame to establish a user entry/interaction page; and to execute script functions from said function frame responsive to user interaction with said user entry/interaction page to create a complete requisition; and wherein said first, second, third, fourth, and fifth program instructions are recorded on said medium.

* * * * *